US00RE45651E

(19) United States
(12) Reissued Patent
Ho et al.

(10) Patent Number: US RE45,651 E
(45) Date of Reissued Patent: Aug. 11, 2015

(54) ELECTRONIC CONTROL METHOD FOR A PLANAR INDUCTIVE BATTERY CHARGING APPARATUS

(71) Applicant: City University of Hong Kong, Hong Kong (HK)

(72) Inventors: Wing Choi Ho, Hong Kong (HK); Chi Kwan Lee, Hong Kong (HK); Ron Shu Yuen Hui, Hong Kong (HK); Shu Hung Chung, Hong Kong (HK)

(73) Assignee: City University of Hong Kong, Hong Kong (HK)

(21) Appl. No.: 14/339,415

(22) Filed: Jul. 23, 2014

Related U.S. Patent Documents

Reissue of:
(64) Patent No.: 8,228,025
Issued: Jul. 24, 2012
Appl. No.: 11/938,042
Filed: Nov. 9, 2007

(51) Int. Cl.
*H02J 7/00* (2006.01)
*H02J 7/02* (2006.01)

(52) U.S. Cl.
CPC ..... *H02J 7/025* (2013.01)

(58) Field of Classification Search
CPC ..... H02J 7/025
USPC ..... 320/108, 139
See application file for complete search history.

(56) References Cited

U.S. PATENT DOCUMENTS 5,568,036 A * 10/1996 Hulsey et al. ..... 320/108
6,118,249 A 9/2000 Brockmann et al. ..... 320/108
6,154,005 A * 11/2000 Hyogo et al. ..... 320/108
6,301,128 B1 10/2001 Jang et al. ..... 363/17
6,356,049 B2 3/2002 Oguri ..... 320/101
6,501,364 B1 12/2002 Hui et al. ..... 336/200
2002/0089305 A1* 7/2002 Park et al. ..... 320/108
2002/0110013 A1* 8/2002 Park et al. ..... 363/153

(Continued)

FOREIGN PATENT DOCUMENTS

GB 2 388 716 A 11/2003
GB 2 389 720 A 12/2003

(Continued)

OTHER PUBLICATIONS

Chang-Gyun Kim; Dong-Hyun Seo; Jung-Sik You; Jong-Hu Park; Cho, B.H., "Design of a contactless battery charger for cellular phone," IEEE Transactions on Industrial Electronics, vol. 48, Issue 6, Dec. 2001, pp. 1238-1247.

(Continued)

*Primary Examiner* — Linh M Nguyen
(74) *Attorney, Agent, or Firm* — Fenwick & West LLP

(57) ABSTRACT

This invention provides an electronic control method for a planar inductive battery charging apparatus on which one or more electronic loads such as mobile phones, MP3 players etc can be placed and charged simultaneously. The power control circuit of the charging pad consists of two power conversion stages. Depending on the nature of the input power supply, the first power stage is an AC-DC power converter with variable output voltage control and a second stage is a DC-AC power inverter with constant current control. The combination of the two stages provides power control of the charging pad and generates AC magnetic flux of ideally constant magnitude over the charging areas within a group of primary windings that are excited.

32 Claims, 9 Drawing Sheets

(56) References Cited

U.S. PATENT DOCUMENTS

| | | | | |
|---|---|---|---|---|
| 2003/0095027 | A1 | 5/2003 | Hui et al. | 336/200 |
| 2003/0210106 | A1 | 11/2003 | Cheng et al. | 333/24 R |
| 2005/0189910 | A1 * | 9/2005 | Hui | 320/108 |

FOREIGN PATENT DOCUMENTS

| | | | |
|---|---|---|---|
| GB | 2 389 767 | A | 12/2003 |
| GB | 2 392 024 | A | 2/2004 |
| GB | 2 398 176 | A | 8/2004 |
| GB | 2 399 225 | A | 9/2004 |
| GB | 2 399 230 | A | 9/2004 |
| GB | 2 399 446 | A | 9/2004 |
| WO | WO 03/105308 | A1 | 12/2003 |
| WO | WO 2004/038888 | A3 | 5/2004 |
| WO | WO 2007/019806 | A1 | 2/2007 |

OTHER PUBLICATIONS

S. C. Tang, S. R. Hui and H. Chung, "Evaluation of the Shielding Effects on Printed-Circuit-Board Transformers using Ferrite Plates and Copper Sheets," IEEE Transactions on Power Electronics, vol. 17, No. 6, Nov. 2002, pp. 1080-1088.

* cited by examiner

ELECTRONIC CONTROL METHOD FOR A PLANAR INDUCTIVE BATTERY CHARGING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

This invention relates to methods and apparatus for the control of a planar battery charging apparatus.

BACKGROUND OF THE INVENTION

The increasing popularity of portable consumer electronic products such as mobile phones, MP3 players and PDAs has prompted new concerns on the huge variety and number of battery chargers that are required and which are costly, inconvenient and eventually lead to electronic waste problems. Inductive or wireless charging apparatus that can charge more than one electronic product have been proposed. Two different approaches to the generation of AC magnetic flux have been proposed, namely "horizontal flux" and "vertical flux" methods.

Inductive electronic chargers with a direct connection have been developed for use with some types of portable electronic equipment such as electric toothbrushes. Inductive chargers have also been proposed in a number of documents such as U.S. Pat. No. 6,356,049, U.S. Pat. No. 6,301,128, U.S. Pat. No. 6,118,249. These inductive chargers, however, use traditional transformer designs with windings wound around ferrite magnetic cores and the main magnetic flux between the primary winding and secondary winding has to go through the magnetic core materials. Other contactless chargers proposed (e.g., Chang-Gyun Kim; Dong-Hyun Seo; Jung-Sik You; Jong-Hu Park; Cho, B. H., "Design of a contactless battery charger for cellular phone," IEEE transactions on Industrial Electronics, Volume: 48, Issue: 6, December 2001 Page(s): 1238-1247) also use magnetic cores as the main structure for the coupled transformer windings. However, these battery chargers do not use a planar structure and each charger is only able to charge one item of electronic equipment at a time.

Recent research in the field of planar magnetics and planar transformer technology has prompted the development of planar contactless battery charging systems for portable electronic equipment. Among them, two proposals are particularly of interest, because they allow one or more items of electronic equipment to be placed and charged simultaneously on the charging surface, regardless of the orientation of the electronic equipment.

The first type of planar battery charger modifies the rotating machine concept by flattening the "round shape" of the motor into a "pancake shape," as described in GB2399225A, GB2398176A, WO2004/038888A, GB2388716A, US2003-210106-A1, GB2392024A, and GB2399230A. The magnetic flux lines flow horizontally along (roughly in parallel to) the planar charging surfaces. The portable electronic equipment to be charged by the charging device needs a secondary winding wound on preferably a soft magnetic core. An AC voltage will be induced in this secondary winding for charging the battery, usually via a battery charging circuit.

A fundamental and inherent limitation of this type of battery charger is that this charging device must have a good electromagnetic flux guide to confine the flux along the lower surface. Otherwise, if such a charging device is placed on a metallic table or a conductive surface, induced current will circulate in the metallic table or conductive surface, resulting in heat generation and power less in the metallic table or conductive surface. One imperfect way to solve this problem is to place a piece of soft-magnetic material (such as a layer of ferrite, iron power or amorphous soft magnetic alloy) as a magnetic flux guide under the lower surface. However, if the electromagnetic flux is large, a fairly thick layer of soft-magnetic material is needed, defeating the purpose of designing a "thin" charging platform and increasing the cost due to the large amount of soft magnetic material required. In addition, the electromagnetic shielding effect of using one layer of soft magnetic material may not be sufficient for electromagnetic compatibility (EMC) requirements. Some flux may still penetrate through the soft magnetic layer and induce current in any conductive surface below the charging platform.

A better solution to shield the magnetic field in the lower surface is to use a combination of a layer of soft magnetic material and a conductive material as disclosed in US2003-095027-A1. It is important to note that the addition of a thin layer of conductive material can significantly increase the shielding effectiveness as reported in US-2003-095027-A1, U.S. Pat. No. 6,501,364, and Tang S. C., Hui S. Y. R and Chung H., "Evaluation of the Shielding Effects on Printed-Circuit-Board Transformers using Ferrite Plates and Copper Sheets," IEEE Transactions on Power Electronics, Vol. 17, No. 6, November 2002, pp. 1080-1088.

The second approach described in WO03/105308A, GB2389720A, GB2399446A, GB2389767A, GB2389767A, WO2007/019806 is to create an AC magnetic field with the flux lines flowing substantially vertically out of the planar charging surfaces, i.e., in a direction substantially perpendicular to the plane of the charging platform. Since the lines of flux enter and leave the planar charging surface vertically, a very thin secondary coil can be used to pick up the magnetic flux. This results in the possibility of a slim design for the secondary module that can be embedded in the portable electronic load.

SUMMARY OF THE INVENTION

According to the present invention there is provided, in a first aspect, a planar battery charging system comprising a primary power transmission side formed of an array of primary windings adapted to generate magnetic flux substantially perpendicular to a charging surface, and a secondary power receiving side comprising a secondary winding associated with a battery to be charged and being adapted to receive the magnetic flux when a secondary winding is placed on the charging surface. A primary winding is energized by a control circuit comprising a first-stage power converter and a second stage power inverter, both being on the primary power transmission side, the first stage power converter being controlled to provide a controlled variable DC link voltage on the primary power transmission side, and the second stage power inverter generating a controlled fixed frequency constant AC current to the primary winding.

The first-stage power converter may be either current controlled or voltage-controlled. Preferably, the current fed to the primary winding is monitored to provide a feedback control of the variable DC link voltage.

In some embodiments of the invention, a step-down transformer may be provided between the output of the second-stage power inverter and the primary winding.

The second-stage power inverter may comprise a resonant tank that sets the frequency of the AC current supplied to the winding. In such embodiments, the second-stage power inverter is switched at a constant frequency that is equal to the frequency of the resonant tank.

Preferably, the secondary side is adapted to receive power optimally at the excitation frequency of the primary winding.

The first-stage power converter may be, for example, a boost converter, or a buck converter, or a flyback converter, or a Cuk converter or a Sepic converter. The second-stage power inverter may be, for example, a full-bridge type, or a half-bridge type, or a Class D type or a Z-source type inverter.

Preferably, when excited, each primary winding is excited at the same frequency and generates the same AC magnetic flux. The AC current supplied to the primary winding is preferably sinusoidal.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

Figure 1:
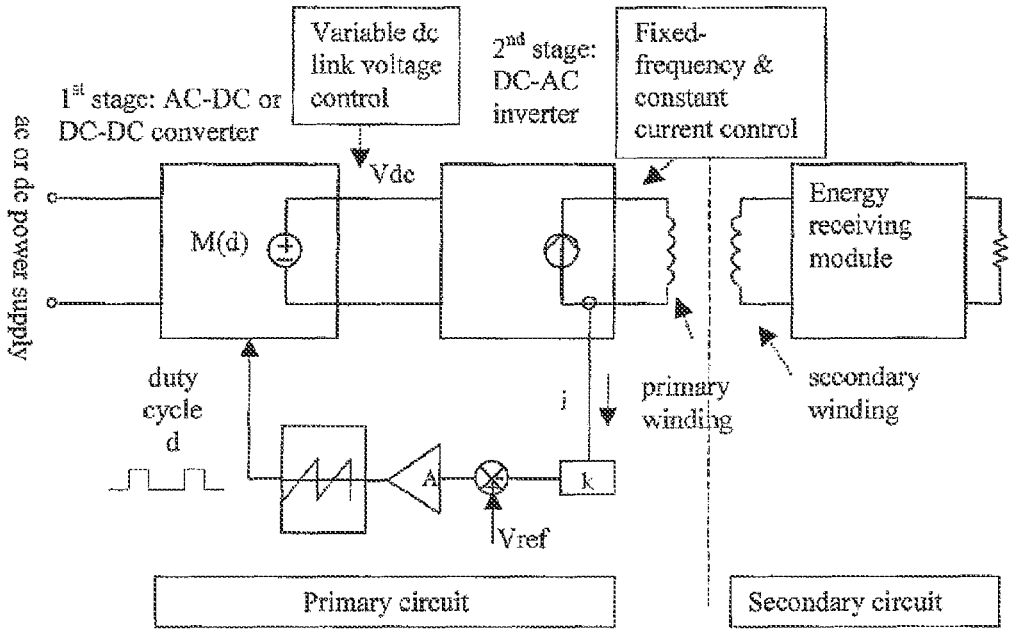
FIG. 1 is a schematic showing the control methodology according to one example of the invention.

For planar battery charging systems, the use of a standard charging pad enables charging inductively a wide range of portable electronic products. In order provide such a pad, preferably several conditions are met:

(1) The windings of the charging pad that are excited are able to generate sufficient energy for charging these electronic products.

(2) Since the inductive charging method relies on the near-field magnetic coupling of the charging pad (primary energy-transmitting circuit or simply primary circuit) and the energy-receiving module (secondary circuit) inside the electronic products, the charging pad should generate an AC magnetic flux of a controllable magnitude that can satisfy a wide range of portable electronic loads to be charged.

(3) Since a range of electronic loads may be charged on the same charging pad, there should be a standard operating frequency and a set of basic secondary circuit design features. In other words, the secondary circuits in a wide range of electronic loads should be compatible with the magnetic flux generated by the charging pad.

In the following, methods and apparatus that can provide power control and AC flux control for the inductive charging pad are described. In order to meet the criteria mentioned previously, the following design and operating conditions are set so that the charging pad can be used to charge a wide range of electronic loads and to enable the flux that is generated by the excited windings to be controlled.

(1) One or more windings of the charging pad are excited and may be termed as an "active group." A common magnitude of AC magnetic flux may be set for each coil on the charging pad so that the AC magnetic field created by each energized coil would be identical. This allows the electronic products to be charged in the same manner anywhere over the charging surface of the charging pad.

(2) Such magnetic flux should provide sufficient energy to charge the electronic products.

(3) The AC magnetic flux generated by the charging pad is set at a specific frequency. The secondary energy-receiving circuits of all electronic loads are designed to pick up the flux at the same frequency. This ensures that the secondary circuits are compatible with the charging pad.

(4) Since the magnetic flux is a function of the excitation current in the windings of an active group, the power inverter that drives the windings in the charging pad should be current controlled.

(5) In order to control the power delivered to the inverter and hence the windings of the active group, the front-stage power converter should have a controllable output voltage. Since the second-stage power inverter is controlled to inject a constant AC current into the windings of the active group, the control of the output voltage of the first-stage power converter can be used to control the power of the active group.

(6) In order to reduce harmonic losses in the windings and EMI radiation, the current in the primary winding is sinusoidal. Therefore, a capacitor should be added to the primary winding to form a resonant tank. The second-stage inverter should be operated at this resonant frequency to ensure that the current in the winding is sinusoidal.

FIG. 1 shows an embodiment of an electronic control system for an inductive charging pad (primary system) and comprising the two power stages that drive a primary winding that forms part (or all) of an active group of the charging pad. The front or first-stage power converter depends on the nature of the input power supply. If the power supply is an AC mains, this first-stage power converter should be an AC-DC power converter. If there is a DC power supply, then the first-stage power converter should be a DC-DC power converter. In either case, the output voltage (i.e., DC-link voltage $V_{dc}$ in FIG. 1) should be a controllable variable.

Figure 2:
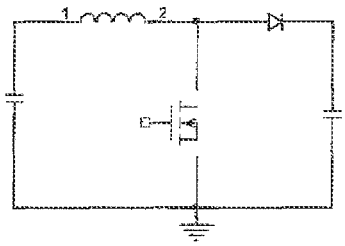
FIG. 2 is a schematic of a boost converter.
Figure 3:
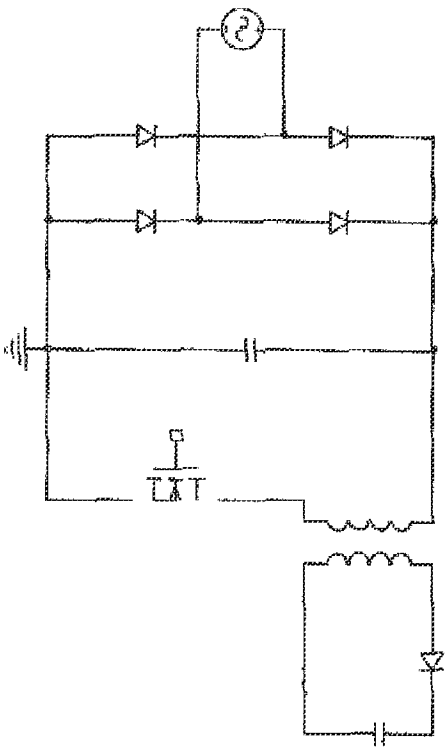
FIG. 3 is a schematic of a flyback-type AC-DC power converter.
Figure 4:
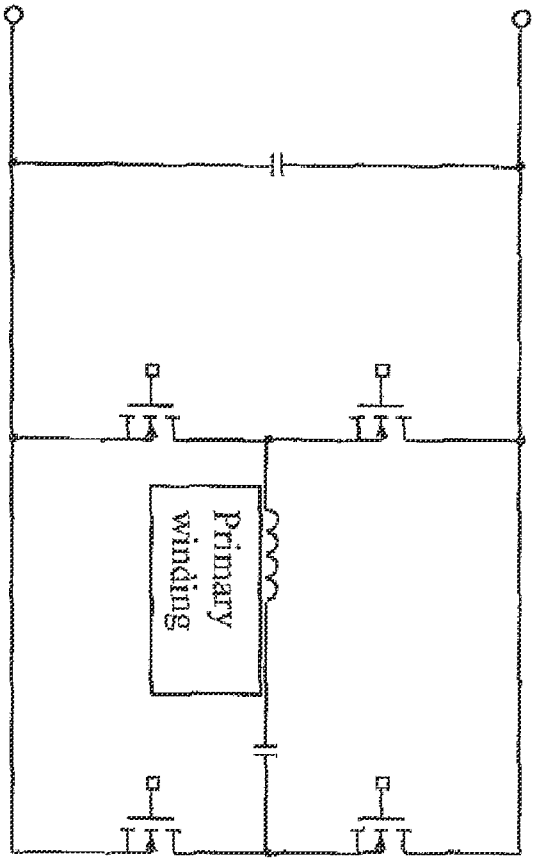
FIG. 4 is a schematic of a full-bridge power inverter with a primary winding and a DC-blocking capacitor.
Figure 5:
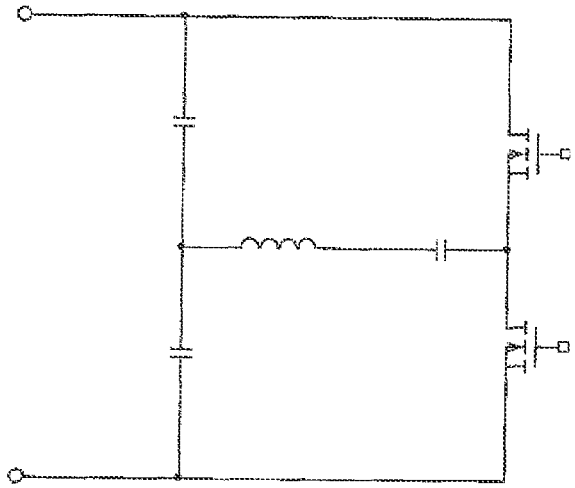
FIG. 5 is a schematic of a half-bridge power inverter with a primary winding and a DC-blocking capacitor.

If the input power supply is a DC voltage source, the front-stage DC-DC power converter can be, but is not restricted to, a flyback converter, boost converter, buck converter, Cuk converter and Sepic converter. An example of boost converter is given in FIG. 2. If the input power supply is an AC voltage source (such as the AC mains), an AC-DC power converter with or without power factor correction can be used as the front-stage power converter. An AC-DC converter typically consists of a diode rectifier and a DC-DC converter. An example of a flyback type AC-DC converter is shown in FIG. 3. The second-stage power inverter can be, for example, a full-bridge inverter (FIG. 4), a half-bridge inverter (FIG. 5) or a Z-source inverter.

Figure 6:
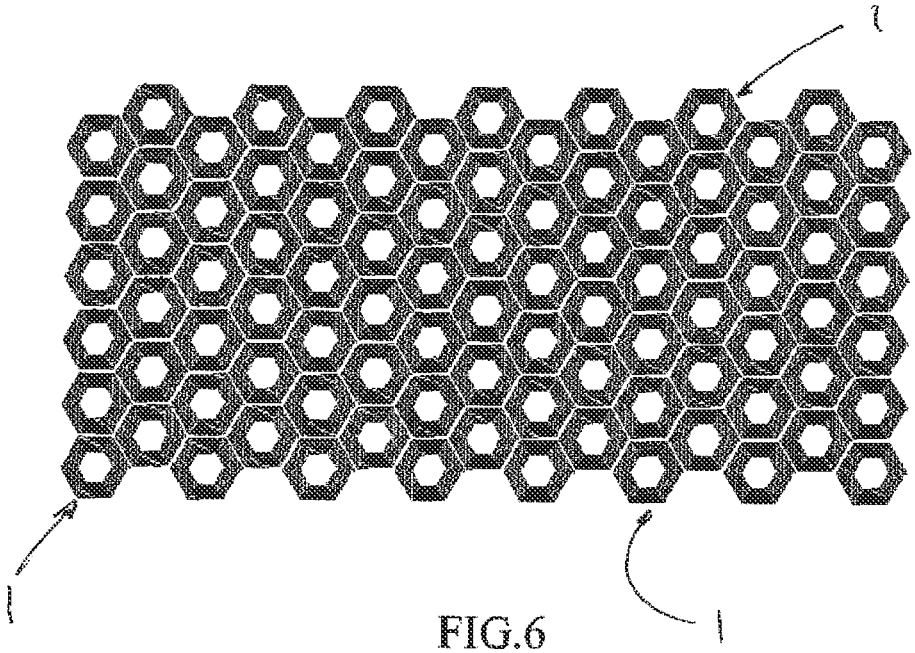
FIG. 6 shows a typical winding array in a planar battery charging platform.

The primary winding(s) of the charging pad may consist of a single coil or an array of coils 1 connected in series as shown in FIG. 6 where hexagonal coils are shown as an example. The array of coils can be of single-layer or multi-layer structures. The array of coils may be re-configurable into groups in order to achieve localized charging such that, if necessary, only those coils through which energy transfer is required are energized.

The control principle is now explained with reference to FIG. 1. The front-stage power converter controls its output voltage (Vdc) by varying the duty-cycle of the converter switch. Typically, a pulse-width modulation (PWM) technique is used to control the duty-cycle of the converter switch, which in turn, controls the output voltage of the power converter. The duty-cycle function is denoted as M(d) in FIG. 1. The first-stage power converter that provides a controllable DC-link voltage (Vdc) can be controlled either in "voltage control" mode or in "current control" mode.

The second-stage power inverter adopts a fixed frequency control. Generally, the diagonal pairs of switches in the full-bridge inverter are switched together and the two pairs are switched in a complementary manner so that an AC voltage can be generated at the output of the inverter. If necessary, a small dead time can be introduced in the switching instants of the two switches in the same inverter leg in order to achieve soft switching, thus reducing the switching loss and EMI radiation. The inverter is switched at a constant frequency, which should preferably be the same as the resonant frequency of the resonant tank in the primary circuit. Since the current fed from the first-stage power converter is kept constant, the second-stage inverter generates a fixed-frequency constant AC current into the winding(s) of an active group. The fixed-frequency operation is important because the secondary circuits of the electronic loads will be designed to receive power transfer at this frequency. This frequency should preferably be chosen so that the radiated electromagnetic interference (EMI) should not violate international electromagnetic compatibility (EMC) requirements.

Under voltage-control mode, the first-stage power converter feeds DC-link voltage to the second-stage power inverter. Under current-control mode, the first-stage power converter feeds a DC current to the second-stage power inverter. In both operating modes, the objective is to maintain a constant current feeding the second-stage power inverter. That is, under voltage-control mode, the power converter will vary its output voltage (Vdc) in order to keep constant the current feeding the second-stage inverter. Under the current-control mode, the power converter is controlled to provide a current of a desired value to the second-stage inverter.

The current feeding the second-stage power inverter is monitored by a current sensor which can be a small resistor or a hall-effect current sensor. If the power absorbed by the secondary load increases (decreases), this current may be reduced (increased). A feedback current is compared with a preset reference (Vref) that represents the desired current feeding the primary winding, which can be set by users, or according to some standard or to flux, power or other requirements communicated back from the load. The error signal is then amplified by amplifier A and compared by a comparator C with a triangular carrier reference of a fixed frequency that determines the switching frequency of the first-stage power converter. The duty cycle will be dynamically adjusted to control the DC-link voltage (Vdc) so as to keep the current feeding the second-stage inverter to the desired current value within a small tolerance.

Figure 7:
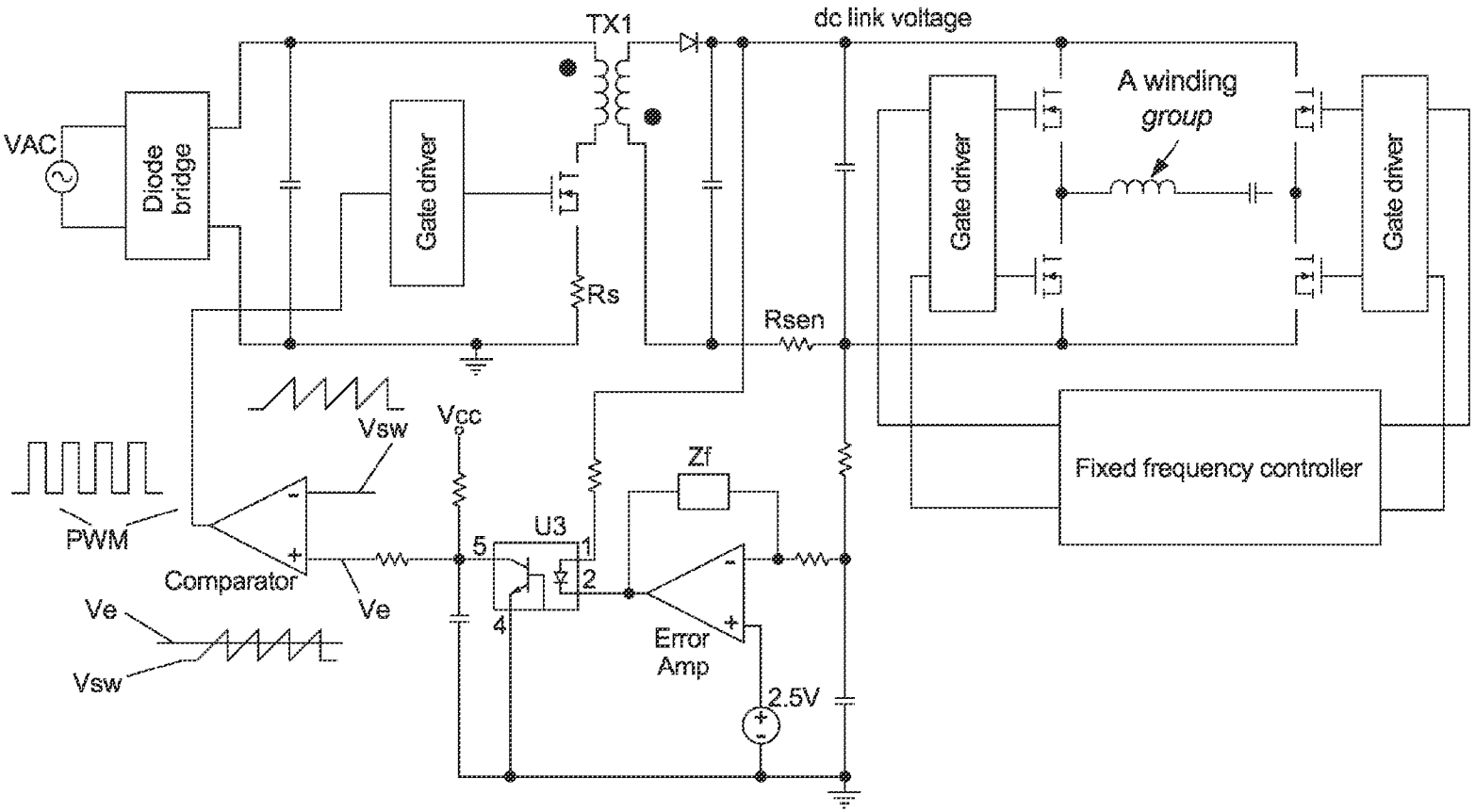
FIG. 7 shows an AC-DC voltage-mode controlled first-stage flyback converter feeding a constant current source to a second-stage full-bridge fixed frequency inverter.

FIG. 7 shows one example of the invention where the charging pad is powered by an AC mains. An AC-DC flyback converter is used to feed an DC-AC inverter that drives the primary winding(s) inside an active group of the charging pad. An AC-DC flyback converter comprising (diode bridge 2 and gate driver 3) operating under a voltage-control mode is illustrated here. Sensing resistor Rsen is used to monitor the current feeding the inverter. This sensed current signal is filtered by a resistive-capacitive filter and then compared with a reference value (Vref—which is arbitrarily set at 2.5V and represents the desired current value in the inverter) in an error amplifier 4, which generates an error signal in its output. This current error signal (Ve) is then fed to a comparator 5 and compared with a sawtooth reference signal (Vsw) that is set at a specific frequency which determines the switching frequency of the first-stage AC-DC flyback converter. The output of this comparator provides the PWM signal for switching the power converter. The duty cycle of this PWM signal controls the output voltage of the flyback converter (i.e. the DC-link voltage Vdc). Vdc is controlled in a manner that keeps the current flowing into the inverter to the desired value within a certain small tolerance. The second-stage inverter is simply driven at constant frequency (at the resonant frequency of the resonant tank in the primary circuit) to inject an AC current of constant magnitude into the primary circuit of the charging pad. The resonant tank of the primary circuit ensures that current in the primary winding(s) of an active group is sinusoidal in order to reduce harmonic losses and EMI radiation.

Figure 8:
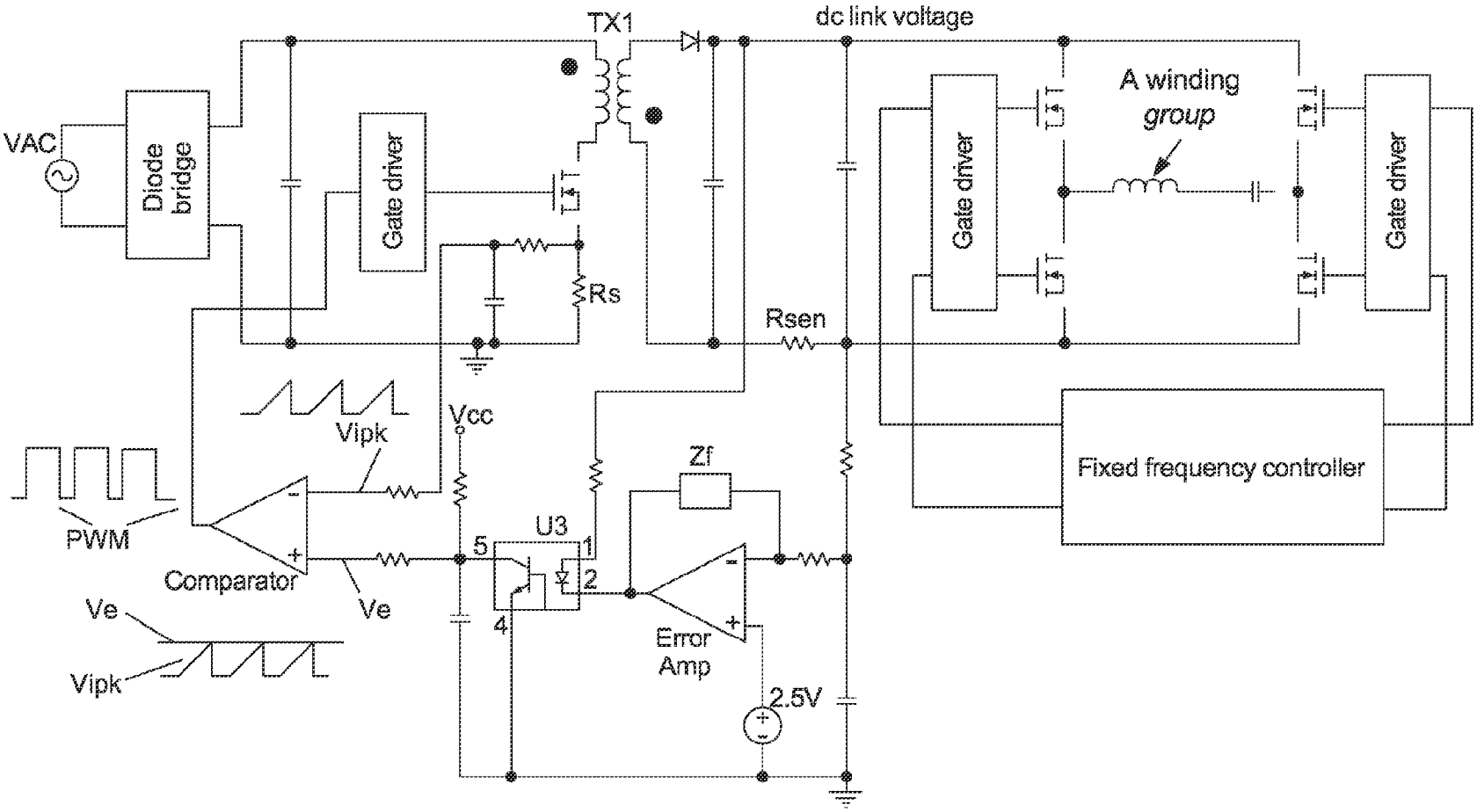
FIG. 8 shows an AC-DC current-mode controlled first-stage flyback converter feeding a constant current source to a second-stage full-bridge fixed frequency inverter.

FIG. 8 shows an example implementation of the invention, where the first-stage power converter is operated under current-control mode. In this implementation, the current sensor Rsen is used to sense the current feeding into the inverter. The sensed current signal is filtered and then compared with a desired current reference (Vref—arbitrarily set at 2.5V) in an error amplifier 14. The current error signal (Ve) is the output of this error amplifier. Another current sensor Rs is used to monitor the current in the power switch of the flyback converter. This switch current is the same as the current in the primary winding of the coupled inductor in the flyback converter. The sensed switch current (Vipk) is filtered and then compared with Ve at comparator 15 in order to generate the PWM signal for driving the switch of the flyback converter. The objective is to for the first-stage converter to feed a desired level of current into the second-stage inverter. The second-stage inverter is simply driven at constant frequency (at the resonant frequency of the resonant tank in the primary circuit) to inject an AC current of constant magnitude into the primary circuit of the charging pad. The resonant tank of the primary circuit ensures that current in the primary winding is sinusoidal in order to reduce harmonic losses and EMI radiation.

Figure 9:
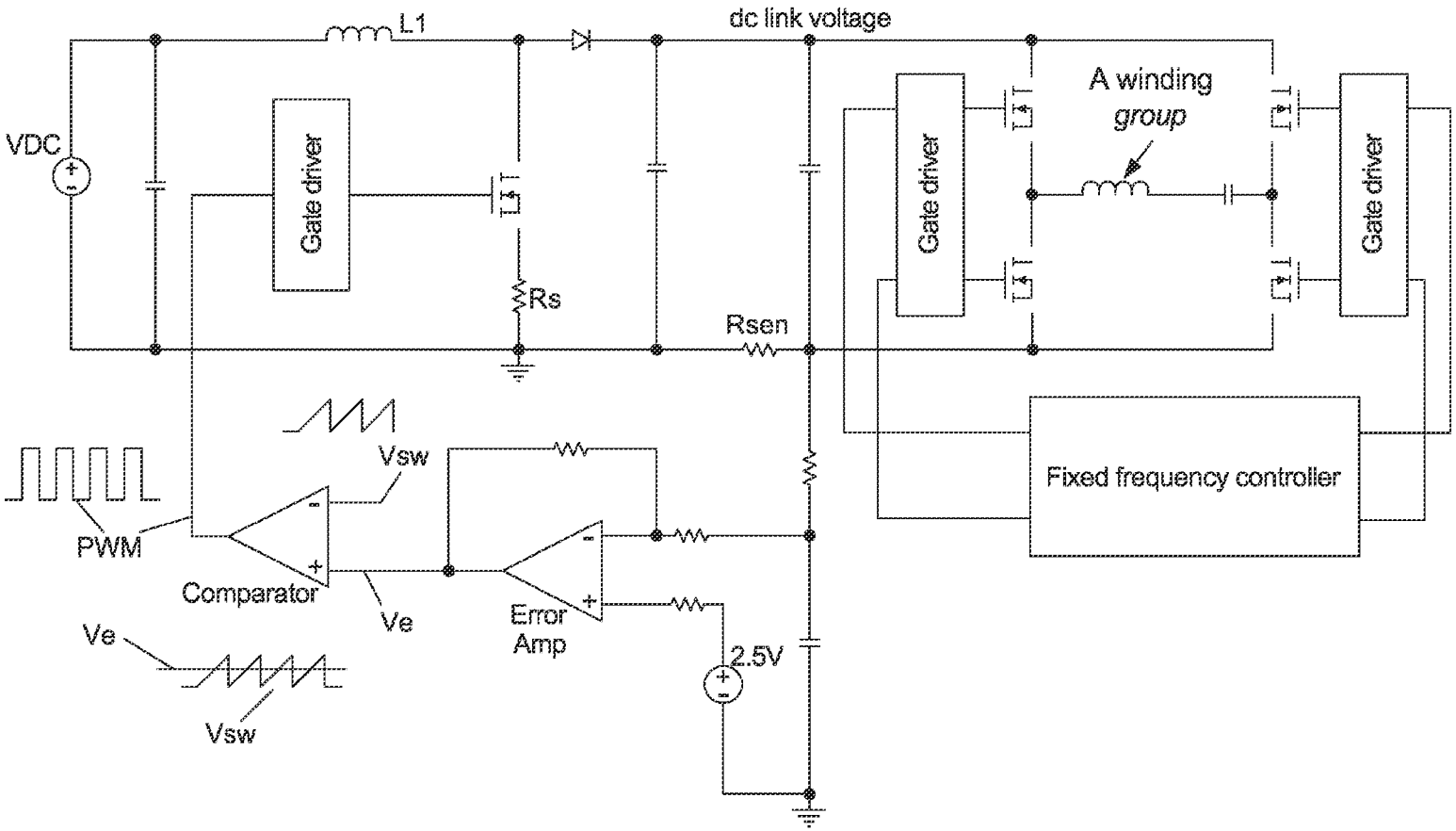
FIG. 9 shows an AC-DC voltage-mode controlled first-stage boost converter feeding a constant current source to a second-stage full-bridge fixed frequency inverter.
Figure 10:
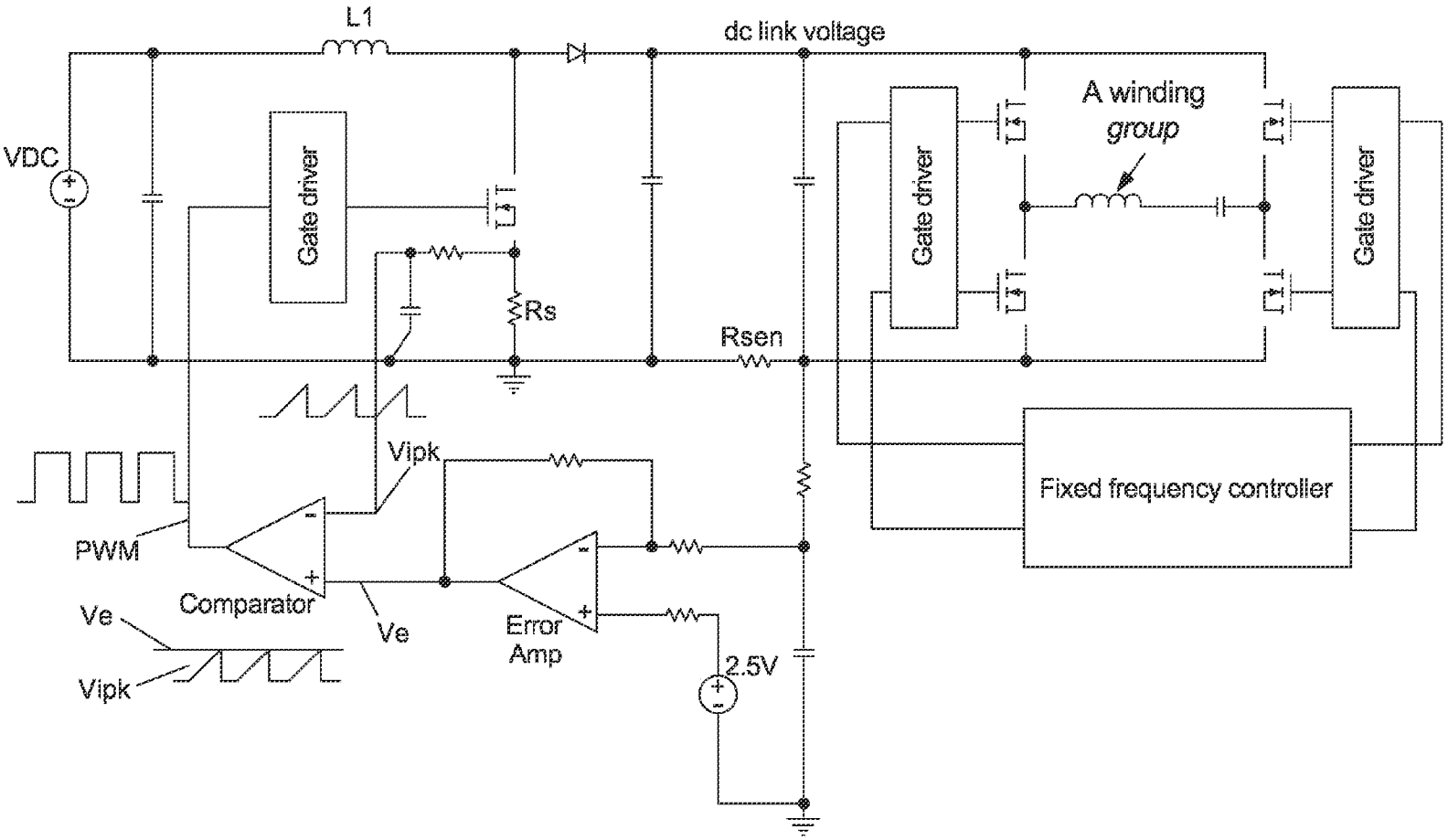
FIG. 10 shows an AC-DC current-mode controlled first-stage boost converter feeding a constant current source to a second-stage full-bridge fixed frequency inverter.

The same principle can be implemented using a boost converter as the first-stage under voltage-control mode and current-control mode as shown in FIG. 9 and FIG. 10, respectively.

Figure 11:
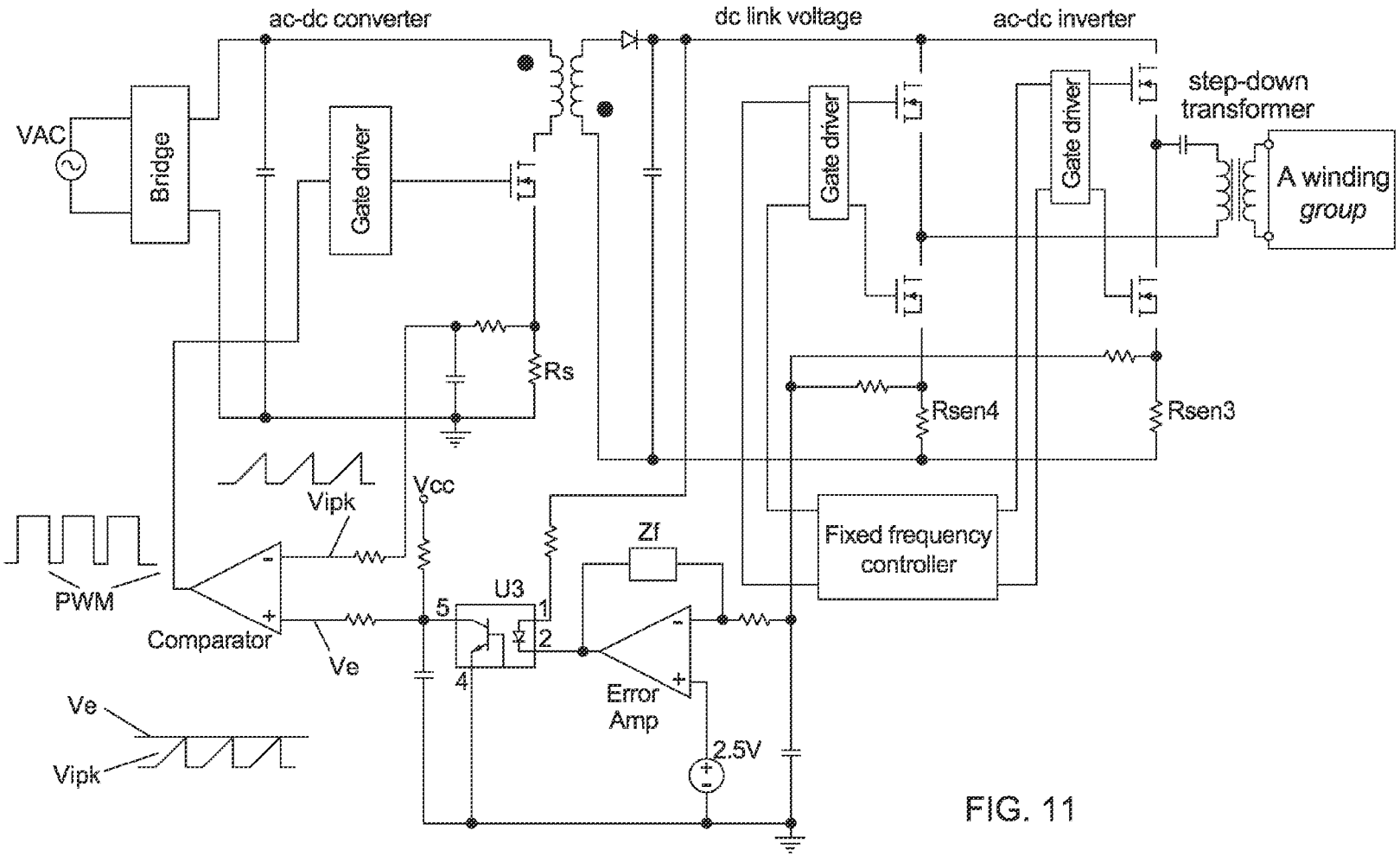
FIG. 11 shows an AC-AC current-mode controlled first-stage flyback converter feeding a full-bridge inverter that provides a step-down current source through a transformer.
Figure 12:
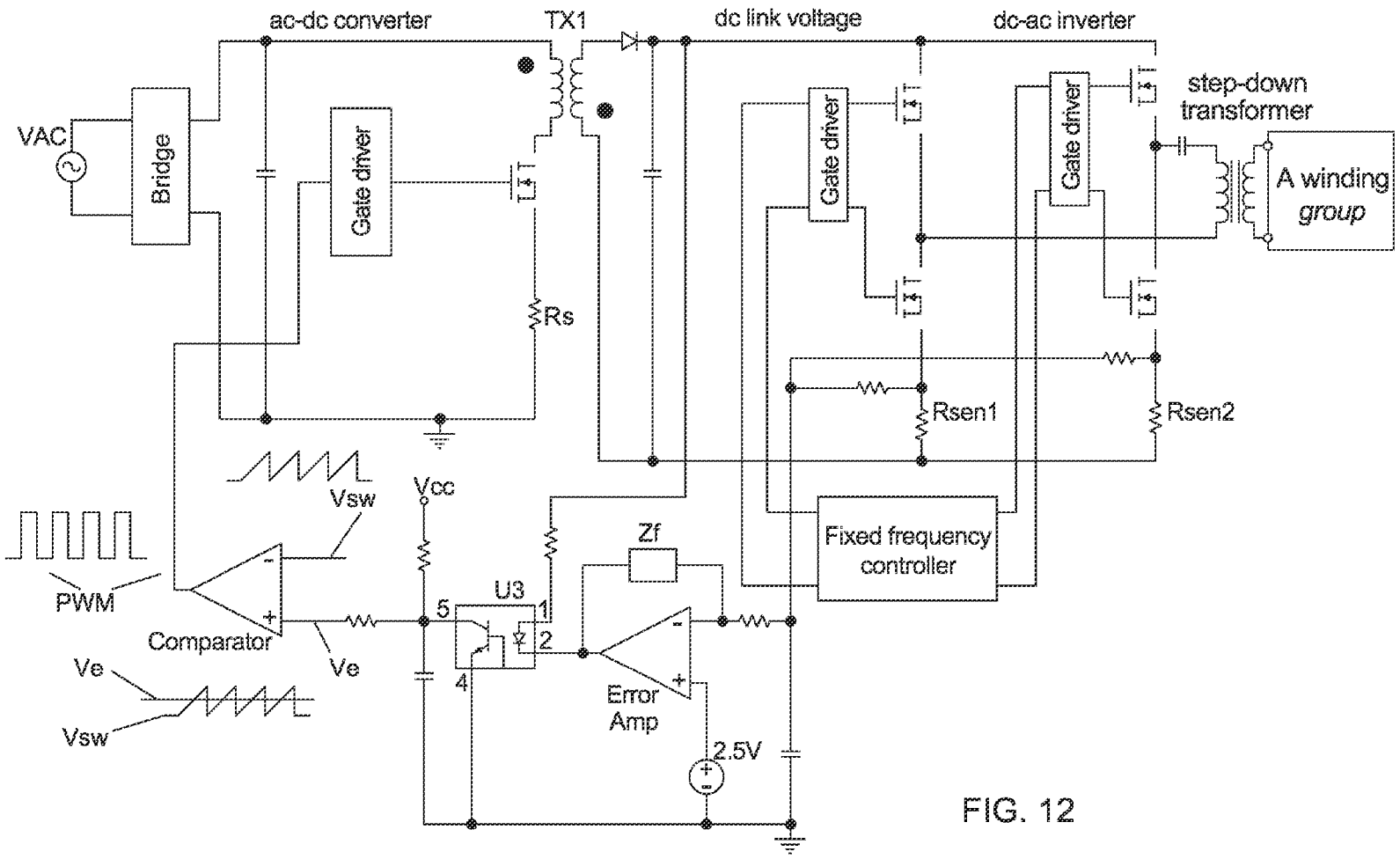
FIG. 12 shows an AC-AC voltage-mode controlled first-stage flyback converter feeding a full-bridge inverter that provides a step-down current source through a transformer.

An alternative way to inject a sinusoidal current into the winding(s) of an active group of the charging pad is to use a second-stage power inverter to drive a resonant tank formed by a capacitor and the primary winding of a step-down transformer 20. Example circuit schematics are shown in FIG. 11 and FIG. 12. The use of a step-down transformer has the advantage that the DC-link voltage of the inverter can be set to a higher value so that the current injected into the capacitor and the primary winding of the transformer can be kept to a relatively low value. This facilitates the choice of components in the circuit by avoiding the need for components such as capacitors that are suitable for use with large currents. The sinusoidal current in the secondary winding of this step-down transformer is then fed into the winding(s) of the active group.

In summary, in order to develop a battery charging pad that meets the criteria mentioned previously for compatibility with a wide range of portable electronic products, the present invention in various aspects uses a first-stage power converter to control directly or indirectly the current to a desired value (within a small tolerance) fed into the second-stage inverter either under voltage-control or current-control mode so that the current injected by the second-stage inverter into the primary winding(s) of an active group of the charging pad can maintain an AC magnetic flux (which is a function of the current) of identical magnitude in all coils energized in the group. In this way, the first-stage power converter also controls the power of the active group.

A resonant tank may be used in the primary circuit in order to ensure that the current in the winding is sinusoidal. Sinusoidal current in the primary winding, which creates the AC magnetic flux, ensures that the harmonic losses and EMI radiation are minimized. The use of a second-stage power inverter that is switched at a constant frequency equal to the resonant frequency of the primary circuit further assists in ensuring that the current in the primary winding is sinusoidal.

The secondary energy-receiving circuit is preferably designed to work optimally at the operating frequency set in the second-stage power inverter of the charging pad to ensure the compatibility of the secondary energy-receiving modules in all loads for this charging pad.

The first-stage power converter may be selected from boost, buck, flyback, Cuk and Sepic type converters but is not restricted thereto. The second-stage power inverter can be a full-bridge, half-bridge, or Class-D and Z-source type converter but again is not restricted thereto. The second-stage power inverter can use a step-down transformer so that a relatively high DC-link voltage can be used in order to reduce the current in the resonant capacitor for a given power requirement.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A planar battery charging system comprising;

a primary power transmission side formed of an array of primary windings adapted to generate magnetic flux substantially perpendicular to a charging surface; and a secondary power receiving side comprising a secondary winding associated with a battery to be charged and being adapted to receive said magnetic flux when a said secondary winding is placed on said charging surface;

wherein a said primary winding is energized by a control circuit comprising a first-stage power converter and a second-stage power inverter, both being on the primary power transmission side, wherein the first-stage power converter is controlled to provide a controlled variable DC-link voltage on the primary power transmission side, and wherein the second-stage power inverter generates a controlled fixed-frequency constant AC current to said primary winding.

2. The planar battery charging system as claimed in claim 1, wherein the first-stage power converter is current controlled.

3. The planar battery charging system as claimed in claim 1, wherein the first-stage power converter is voltage-controlled.

4. The planar battery charging system as claimed in claim 1, wherein the current fed to said primary winding is monitored to provide a feedback control of said variable DC-link voltage.

5. The planar battery charging system as claimed in claim 1, wherein a step-down transformer is provided between the output off said second-stage power inverter and the primary winding.

6. The planar battery charging system as claimed in claim 1, wherein said second-stage power inverter comprises a resonant tank that sets the frequency of said AC current supplied to said winding.

7. The planar battery charging system as claimed in claim 6, wherein said second-stage power inverter is switched at a constant frequency that is equal to the frequency of the resonant tank.

8. The planar battery charging system as claimed in claim 1, wherein the secondary side is adapted to receive power at an excitation frequency of the primary winding.

9. The planar battery charging system as claimed in claim 1, wherein the first-stage power converter comprises one of a boost converter, a buck converter, a flyback converter, a Cuk converter, and a Sepic converter.

10. The planar battery charging system as claimed in claim 1, wherein the second-stage power inverter comprises one of a full-bridge type, a half-bridge type, a Class D type, and a Z-source type inverter.

11. The planar battery charging system as claimed in claim 1, wherein each primary winding has the same excitation frequency and generates the same AC magnetic flux.

12. The planar battery charging system as claimed in claim 1, wherein the AC current supplied to the primary winding is sinusoidal.

*13. A planar battery charging system comprising;*

*a primary power transmission side formed of an array of primary windings adapted to generate magnetic flux substantially perpendicular to a charging surface;*

*wherein a said primary winding is energized by a control circuit comprising a first-stage power converter and a second-stage power inverter, both being on the primary power transmission side, wherein the first-stage power converter is controlled to provide a controlled variable DC-link voltage on the primary power transmission side, and wherein the second-stage power inverter generates a controlled fixed-frequency constant AC current to said primary winding.*

*14. The planar battery charging system as claimed in claim 13, wherein the first-stage power converter is current controlled.*

*15. The planar battery charging system as claimed in claim 13, wherein the first-stage power converter is voltage-controlled.*

*16. The planar battery charging system as claimed in claim 13, wherein the current fed to said primary winding is monitored to provide a feedback control of said variable DC-link voltage.*

*17. The planar battery charging system as claimed in claim 13, wherein a step-down transformer is provided between the output of said second-stage power inverter and the primary winding.*

*18. The planar battery charging system as claimed in claim 13, wherein said second-stage power inverter comprises a resonant tank that sets the frequency of said AC current supplied to said winding.*

*19. The planar battery charging system as claimed in claim 18, wherein said second-stage power inverter is switched at a constant frequency that is equal to the frequency of the resonant tank.*

*20. The planar battery charging system as claimed in claim 13, wherein the first-stage power converter comprises one of a boost converter, a buck converter, a flyback converter, a Cuk converter, and a Sepic converter.*

*21. The planar battery charging system as claimed in claim 13, wherein the second-stage power inverter comprises one of a full-bridge type, a half-bridge type, a Class D type, and a Z-source type inverter.*

*22. The planar battery charging system as claimed in claim 1, wherein each primary winding has the same excitation frequency and generates the same AC magnetic flux.*

*23. The planar battery charging system as claimed in claim 1, wherein the AC current supplied to the primary winding is sinusoidal.*

*24. The planar battery charging system as claimed in claim 1, wherein the magnetic flux is adapted to be received by a secondary winding of a physically separate secondary power receiving side when said secondary winding is placed on said charging surface, the magnetic flux thereby charging a battery of the second power receiving side.*

*25. A planar battery charging system comprising;*

*a primary-side control circuit adapted to power a physically separate secondary side comprising:*

*a first-stage power converter coupled to a primary-side input voltage and configured to generate a variable DC-link output voltage while the power converter is operating in a specified control mode;*

*a second-stage power inverter configured to receive the variable DC-link output voltage from the first-stage power converter and to generate an inverter output current having a constant alternating current (AC) and a fixed frequency;*

*an active group of primary windings included in an array of primary windings, the active group of primary windings configured to receive the output current of the second-stage power inverter to generate magnetic flux in a direction substantially perpendicular to a charging surface of the planar battery charging system.*

*26. The planar battery charging system as claimed in claim 25, wherein the specified control mode is a current control mode.*

*27. The planar battery charging system as claimed in claim 25, wherein the specified control mode is a voltage control mode.*

*28. The planar battery charging system as claimed in claim 25, further comprising a sensor to detect current supplied to the active group of primary windings and provide a feedback control of the variable DC-link output voltage of the first-stage power converter.*

*29. The planar battery charging system as claimed in claim 25, wherein the second-stage power inverter comprises a resonant tank that sets the frequency of the inverter output current.*

*30. The planar battery charging system as claimed in claim 29, wherein the second-stage power inverter is switched at a frequency that is equal to the frequency of the resonant tank.*

*31. The planar battery charging system as claimed in claim 25, wherein the first-stage power converter comprises one of a boost converter, a buck converter, a flyback converter, a Cuk converter, and a Sepic converter.*

*32. The planar battery charging system as claimed in claim 25, wherein the first-stage power inverter comprises one of a full-bridge type, a half-bridge type, a Class D type, and a Z-source type inverter.*

* * * * *